(12) United States Patent
Pahl et al.

(10) Patent No.: US 8,205,681 B1
(45) Date of Patent: Jun. 26, 2012

(54) AERATION CORE PROCESSOR

(75) Inventors: Gaylord M. Pahl, Excelsior, MN (US);
Jack R. Gust, Northfield, MN (US);
David J. Scherbring, Savage, MN (US);
Robert C. Comer, Clinton Township, MI (US); Reta Comer Wee, legal representative, Clinton Township, MI (US); Dan Comer, legal representative, Lake St. Louis, MO (US); Steve Comer, legal representative, Waxahachie, TX (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/069,184

(22) Filed: Feb. 7, 2008

(51) Int. Cl.
*A01B 45/02* (2006.01)

(52) U.S. Cl. .................. 172/22; 172/39; 492/6; 15/83

(58) Field of Classification Search .................. 172/21, 172/22, 39, 32, 33; 56/14.2; 492/6; 15/78, 15/79.2, 82, 83
See application file for complete search history.

(56) References Cited

U.S. PATENT DOCUMENTS

| | | | | |
|---|---|---|---|---|
| 536,637 | A * | 4/1895 | Lucas | 15/55 |
| 1,328,521 | A * | 1/1920 | Jemmison | 15/83 |
| 2,244,848 | A * | 6/1941 | Olds et al. | 15/83 |
| 2,368,331 | A * | 1/1945 | Seaman | 404/92 |
| 2,564,352 | A | 8/1951 | Bjorklund | |
| 2,631,418 | A | 3/1953 | Ronning | |
| 2,881,844 | A * | 4/1959 | Miller | 172/22 |
| 2,986,841 | A * | 6/1961 | MacDonald | 47/1.42 |
| 3,222,706 | A * | 12/1965 | Kaar et al. | 15/340.3 |
| 3,331,195 | A * | 7/1967 | Heth et al. | 56/13.1 |
| 3,513,498 | A * | 5/1970 | Bennich | 15/84 |
| 3,668,730 | A * | 6/1972 | Scharmann et al. | 15/83 |
| 3,670,359 | A * | 6/1972 | Gutbrod | 15/348 |
| 3,676,988 | A | 7/1972 | Hauser-Lienhard | |
| 3,805,310 | A * | 4/1974 | Oberdank | 15/83 |
| 3,823,435 | A * | 7/1974 | Rhodes et al. | 15/79.1 |
| 3,893,286 | A * | 7/1975 | Buttram et al. | 56/328.1 |
| 3,977,476 | A * | 8/1976 | van der Lely | 172/51 |
| 3,993,141 | A * | 11/1976 | Donohue | 171/63 |

(Continued)

FOREIGN PATENT DOCUMENTS

FR 2277624 2/1976

*Primary Examiner* — Robert Pezzuto
*Assistant Examiner* — Jamie L McGowan
(74) *Attorney, Agent, or Firm* — James W. Miller (57) ABSTRACT

A core processor comprises a frame that supports a housing. The housing carries a rotary pulverizer inside a semi-cylindrical drum and a rotary pick up brush in a pick up head below the drum. The drum is open at the rear to form a rear discharge opening. The pick up head includes a full width rear roller behind the brush to support the housing for rolling movement over the ground in a work mode of the processor. In the work mode, the brush picks up aeration cores from the ground, delivers them to the rotary pulverizer which comminutes or pulverizes the aeration cores, and the particle debris so created exits through the rear discharge opening beneath a hood or shroud. A powered roller is located at a junction between the orbits of the brush and the pulverizer to help keep the junction free of a build up of core material. In a transport mode of the core processor, a pair of transport wheels are lowered into engagement with the ground until the pick up head is lifted out of engagement with the ground.

6 Claims, 9 Drawing Sheets

U.S. PATENT DOCUMENTS

| | | | |
|---|---|---|---|
| 4,037,284 A * | 7/1977 | McDonald | 15/83 |
| 4,148,362 A * | 4/1979 | Orth | 172/22 |
| 4,212,357 A * | 7/1980 | Clements et al. | 172/22 |
| 4,417,627 A | 11/1983 | Willibald | |
| 4,809,380 A * | 3/1989 | VanGinhoven et al. | 15/5 |
| 4,825,495 A * | 5/1989 | VanGinhoven et al. | 15/5 |
| 4,905,460 A | 3/1990 | Toman | |
| 4,914,774 A * | 4/1990 | Sheehan et al. | 15/5 |
| 5,069,293 A * | 12/1991 | St. Romain | 172/22 |
| 5,178,221 A * | 1/1993 | Hamawaki et al. | 172/22 |
| 5,329,661 A * | 7/1994 | Smith | 15/80 |
| 5,398,768 A * | 3/1995 | Staples | 172/21 |
| 5,423,386 A * | 6/1995 | Lapearous | 172/22 |
| 5,806,293 A * | 9/1998 | Klein et al. | 56/249 |
| 5,816,336 A * | 10/1998 | Underhill | 172/22 |
| 6,142,239 A * | 11/2000 | Underhill | 172/22 |
| 6,142,240 A * | 11/2000 | Underhill | 172/22 |
| 6,192,991 B1 * | 2/2001 | Seliga et al. | 172/22 |
| 6,253,858 B1 * | 7/2001 | Warke | 172/22 |
| 6,321,849 B1 * | 11/2001 | Underhill | 172/22 |
| 6,421,870 B1 * | 7/2002 | Basham et al. | 15/83 |
| 6,488,100 B2 * | 12/2002 | Underhill | 172/22 |
| 6,550,705 B2 | 4/2003 | Pfisterer | |
| 6,607,039 B2 * | 8/2003 | Simon | 172/22 |
| 6,687,939 B1 * | 2/2004 | Koester | 15/83 |
| 7,163,067 B2 * | 1/2007 | Job | 172/21 |
| 7,163,068 B2 * | 1/2007 | Job | 172/439 |

* cited by examiner

AERATION CORE PROCESSOR

TECHNICAL FIELD

This invention relates to a processor that picks up the aeration cores left on the ground by a turf aerator, comminutes such cores, and deposits the particles or the comminuted cores onto the ground.

BACKGROUND OF THE INVENTION

It is well known in the turf care industry that the health of the turf can be enhanced by periodically aerating the turf. Aerating the turf involves punching an array of spaced holes into the ground over the area of the turf that is to be aerated. Such aeration holes relieve soil compaction and facilitate the entry of air and water into the turf. This has a beneficial effect on the turf and leads to healthier, more vigorous turf.

One type of tine used in conjunction with such aerators is a hollow tine designed to pull up a generally cylindrical aeration core from the turf. Each aeration core typically includes an upper grassy or plant containing layer and a lower soil layer that underlies and comes up with the upper layer. Such hollow tines deposit the aeration cores which they pull out of the turf back down onto the surface of the turf. Thus, following the completion of an aeration operation, the surface of the turf will be covered or littered with a large number of aeration cores. The aeration cores will cover the turf surface wherever they fell and are spaced from one another atop the turf surface in various rows and columns of cores.

The aeration cores left by an aerator can be left on top of the turf surface where they will gradually decompose and erode back into the turf surface. Simply leaving the cores in place is often done in a homeowner's yard after the yard has been aerated. The aeration cores will gradually erode or disintegrate over time and fall back down into the canopy of the turf surface. Unfortunately, this can take some time to do since known aeration cores are relatively thick having a diameter of ⅜ to ⅞ of an inch or so and a length from ½ to 4 inches or so.

In other areas where the grass is cut quite short and the turf surface sees relatively heavy and constant use, such as the greens and fairways of golf courses or the surfaces of sports fields such as soccer fields, it is not desirable to simply leave the cores in place to erode over time. Instead, the cores are usually positively broken up and dispersed down into the turf surface. This permits the turf surface to quickly return to its normal state to allow continued use thereof, namely to allow play to resume on the greens or fairways of the golf course or on the surfaces of the sports fields.

Various methods of treating the aeration cores left on the ground have been adopted and used in the past. In one case, a drag mat or the like is dragged over the turf surface, and thus over the cores lying on the turf surface, to break up the cores into pieces and to force these smaller pieces back down into the turf surface. Alternatively, various powered machines have been developed that will mechanically disintegrate the cores by the operation of rotary flails or choppers, such as the machine shown in U.S. Pat. No. 4,905,424. In some of these machines, the cores are picked up off the ground, the upper grassy layer of the core is separated from the soil portion of the core, the soil portion of the core is disintegrated and deposited back down into the turf, and the grassy portions of the core are collected in a hopper. U.S. Pat. No. 6,142,240 to Underhill shows a core processor of this latter type.

Existing core processors often use various fixed flanges or surfaces against which the cores are thrown to aid in their disintegration. However, when the cores being processed are wet, the cores or pieces of the cores tend to stick or build up on such surfaces. This build up can happen to such an extent that the core processor is no longer effective for its task. One must stop using the core processor and take the time to clean the surfaces that have accumulated the built up aeration core debris. This can be time consuming and inconvenient. Thus, there is a need in the art for a core processor that is more effective in pulverizing the aeration cores without using numerous impact surfaces to aid in disintegrating the cores, even when the cores being comminuted tend to be sticky and adherent.

Another desirable goal for a core processor is to enable the processor to properly pick up cores from the ground without missing many cores. Existing core processors use a pair of transport wheels to allow the core processor to roll over the ground. Such transport wheels are needed in a transport mode to allow the core processor to be transported from one location to another at an acceptable speed. However, such transport wheels do not follow ground contours well on very uneven terrain. Thus, existing core processors have a tendency to miss some cores entirely, or to dig into the ground and perhaps crush or mash some cores without picking them up, when the core processor is being moved or very uneven terrain. This is disadvantageous.

SUMMARY OF THE INVENTION

One aspect of this invention relates to a core processor for turf aeration cores. The core processor comprises a frame supported for movement over the ground. A rotary brush is carried on the frame for picking up aeration cores from the ground. A rotary pulverizer is carried on the frame for receiving aeration cores from the brush and for pulverizing such cores into particles. A rear discharge opening is provided on the frame for receiving the core particles from the pulverizer and for discharging the core particles in a rearward direction from the frame.

Another aspect of this invention relates to a core processor for turf aeration cores. The core processor comprises a frame that is movable over the ground. A housing is carried on the frame. The housing carries a rotary pulverizer inside a drum with the drum having a discharge opening, a rotary pick up brush in a pick up head below the drum, and a powered roller located at a junction between the orbits of the brush and the pulverizer to help keep the junction free of a build up of core material. In a work mode of the core processor, the brush picks up aeration cores from the ground, delivers the aeration cores to the rotary pulverizer which comminutes or pulverizes the aeration cores, and the particle debris so created exits through the discharge opening.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
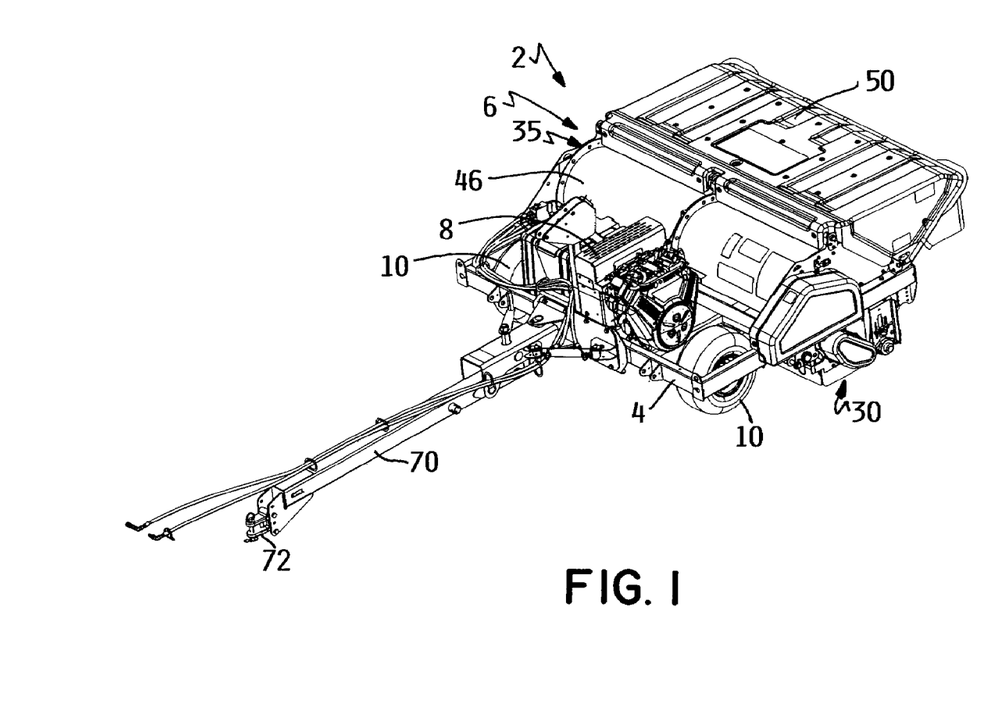
FIG. 1 is a perspective view of an aeration core processor according to this invention, particularly illustrating the core processor in a work mode with the transport wheels raised off the ground and with the pick up brush and ground engaging rear roller in engagement with the ground.
Figure 2:
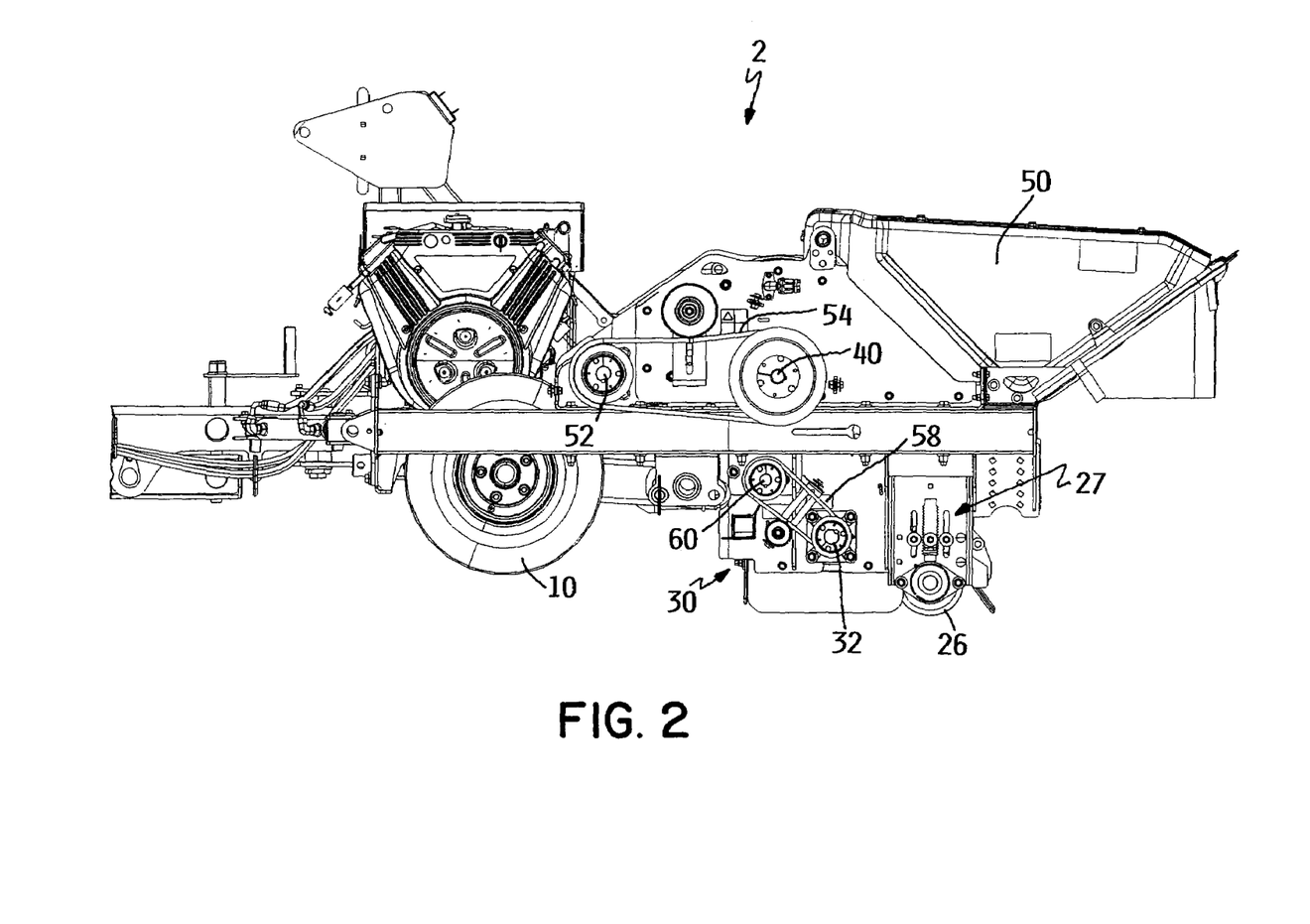
FIG. 2 is a left side elevational view of the core processor of FIG. 1, particularly illustrating the core processor with various belt covers removed to shown the drive to various powered components of the core processor
Figure 3:
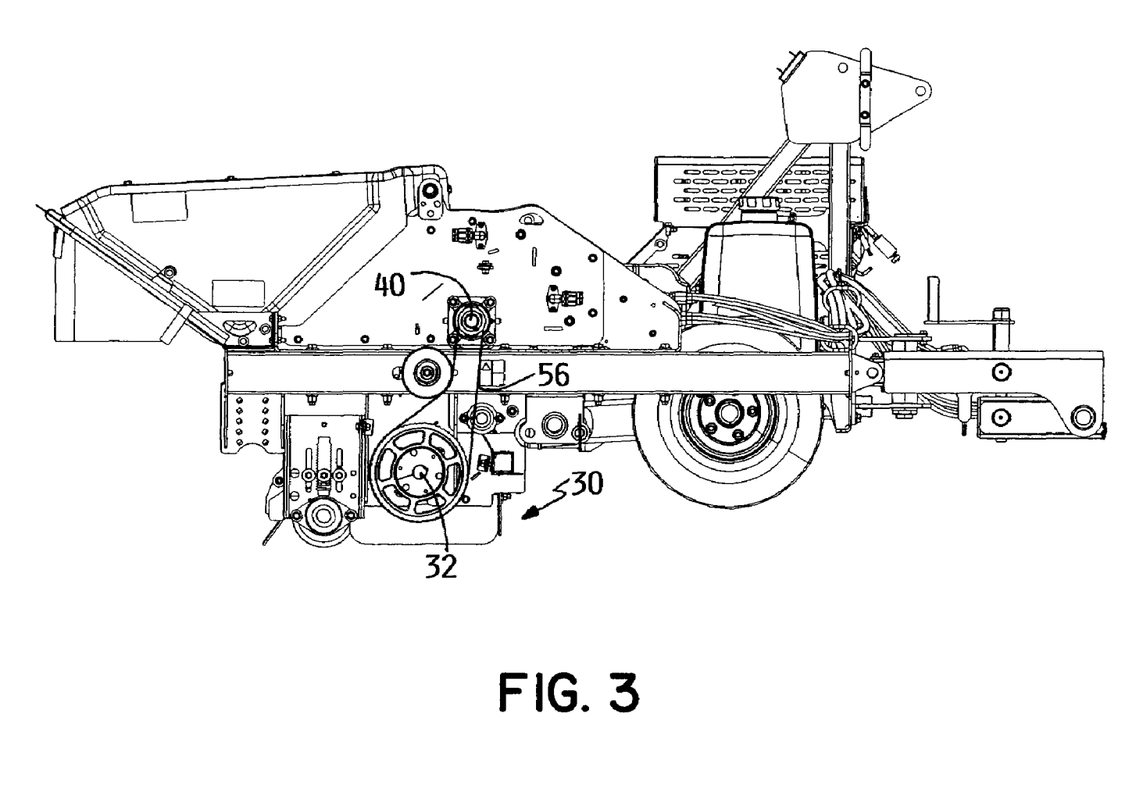
FIG. 3 is a view similar to FIG. 2 but showing the right side of the core processor of FIG. 1, again with a belt cover removed.

Referring first to FIG. 1, an aeration core processor according to this invention is generally illustrated as 2. Processor 2 includes a frame 4 of any suitable shape that carries a housing 6 towards the rear of frame 4. A power source, such as an internal combustion engine 8, is mounted at the front of frame 4 ahead of housing 6. Two laterally spaced ground engaging transport wheels 10 are carried on frame 4 as well.

Figure 7:
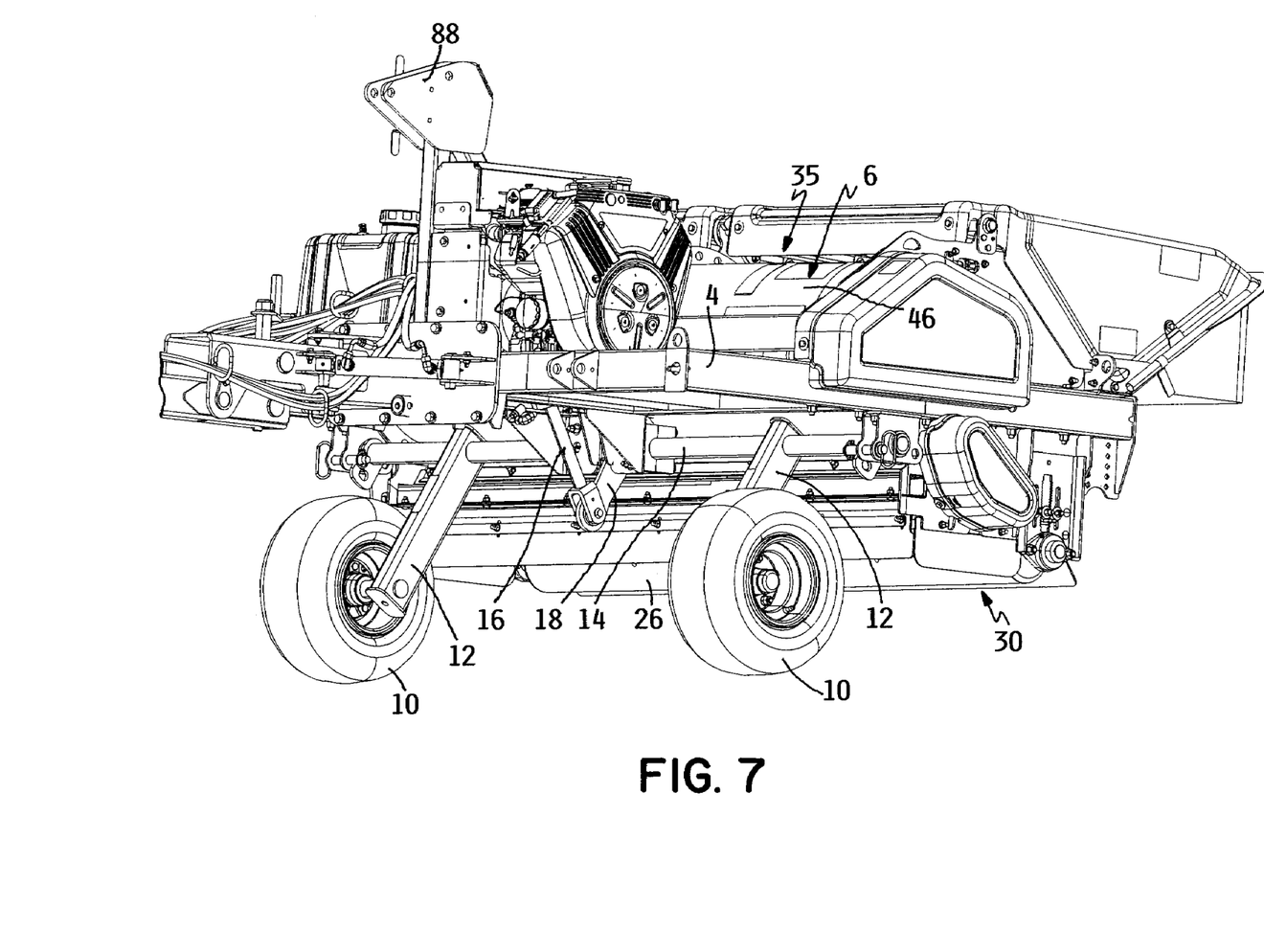
FIG. 7 is a left side elevational view of the core processor of FIG. 1, particularly illustrating the core processor in a transport mode in which the transport wheels are in engagement with the ground and the pick up brush and ground engaging rear roller are raised out of engagement with the ground.

Referring now to FIG. 7, each transport wheel 10 is rotatably journalled on the lower end of a pivotal arm 12. The upper end of pivotal arm 12 for each transport wheel 10 is fixed to a transverse pivot shaft 14. Pivot shaft 14 is itself rotatably journalled to the underside of frame 4 of processor 2. A piston 16 of a hydraulic cylinder is attached to a link 18 connected to pivot shaft 14.

When piston 16 is extended, transport wheels 10 are lowered into engagement with the ground and housing 6 of processor 2 is lifted up out of engagement with the ground. This is a transport mode in which processor 2 is not being used to process aeration cores but is being transported at higher speeds from one location to another. The transport mode is depicted in FIG. 7. When piston 16 is retracted, transport wheels 10 are lifted up out engagement with the ground and housing 6 of processor 2 now engages the ground. This is a work mode in which processor 2 will be propelled forwardly at lower speeds than in the transport mode and will be used to process aeration cores. The work mode is depicted in FIGS. 1-6, 8 and 9.

Figure 4:
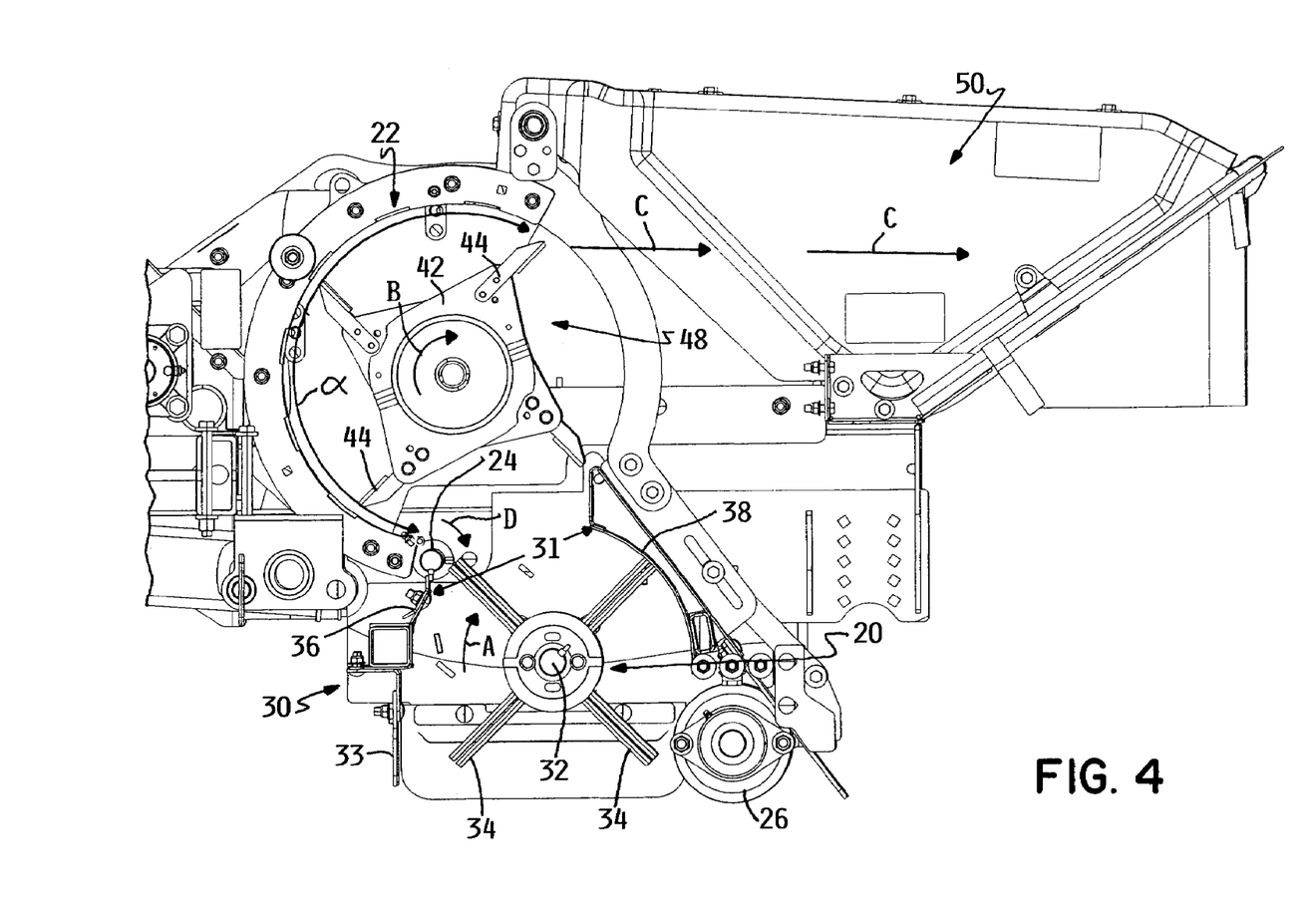
FIG. 4 is an enlarged side elevational view of the core processor of FIG. 1 with portions of the core processor having been removed, particularly illustrating the ground engaging rear roller, the powered rotary pick up brush, the powered rotary pulverizer, and the powered roller at the junction between the brush and the pulverizer for preventing adhesion of core debris at the junction.
Figure 5:
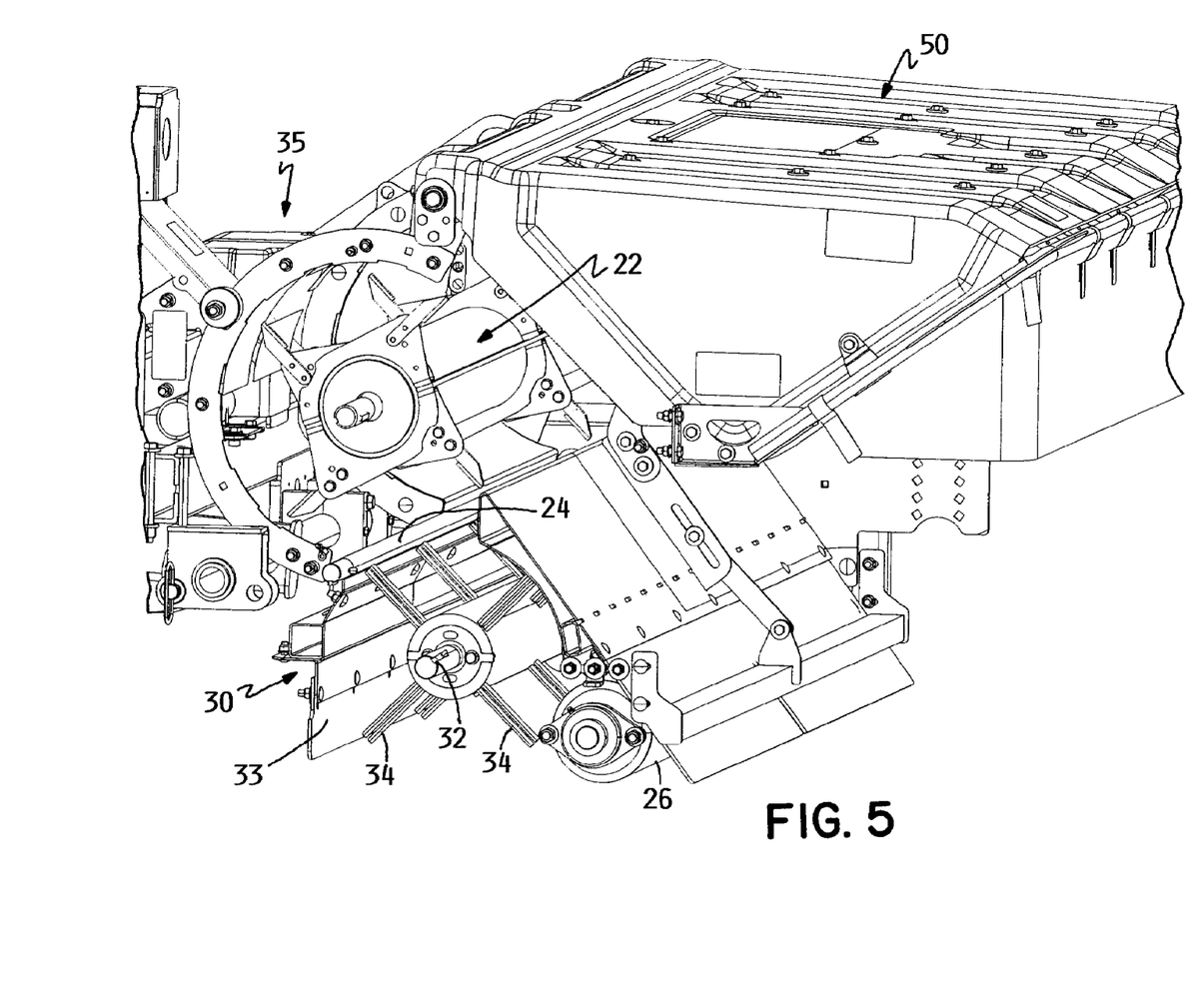
FIG. 5 is a perspective view of the portion of the core processor shown in FIG. 4, but with one side of the rear discharge hood having been removed to illustrate the pick up brush, pulverizer, and powered roller from the rear looking in through the hood.
Figure 6:
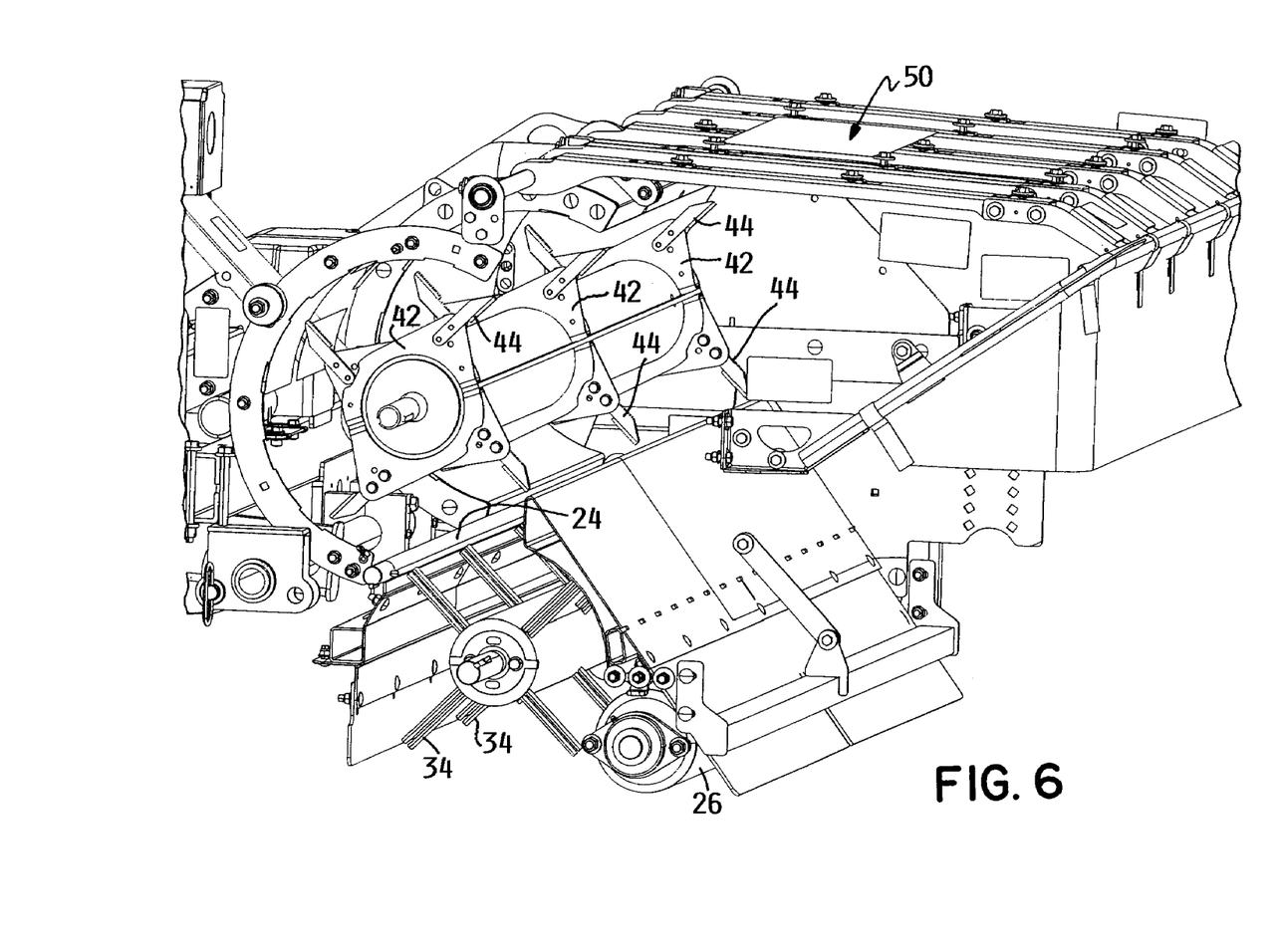
FIG. 6 is a perspective view similar to FIG. 5, but with the rear discharge hood entirely removed.

Referring now to FIG. 4, housing 6 of processor 2 encloses and houses a number of powered components including a rotary pick up brush 20, a rotary pulverizer 22, and a powered roller 24. In addition, housing 6 of processor 2 carries a non-powered, ground engaging, full width rear roller 26. Rear roller 26 supports housing 6 for rolling movement over the ground in the work mode of processor 2. In the work mode of processor 2, rear roller 26 helps processor 2 better adapt to and follow the contours of the ground. Thus, processor 2 of this invention can tilt side to side to better follow sloping or uneven terrain, thereby enabling processor 2 to more completely pick up aeration cores from the ground. Each end of rear roller 26 is adjustably connected to head 30 by a height adjustment mechanism 27 to allow the vertical position of brush 20 relative to the ground to be adjusted.

Referring now to the powered components of processor 2, brush 20 is carried within a pick up head 30 forming the bottom of housing 6. Brush 20 comprises a transverse brush shaft 32 having a plurality of circumferentially spaced, radially outwardly extending bristles 34 made of any suitable material. Bristles 34 are closely spaced in a side-to-side manner over the length of brush shaft 32, with the number of bristles 34 having been decreased and the transverse spacing of bristles 34 having been greatly exaggerated in FIGS. 5 and 6 for the purpose of clarity. Brush 20 is situated within head 30 behind a flexible front flap 33 and in front of rear roller 26. The purpose of brush 20 is to sweep or brush aeration cores lying on the ground upwardly off the ground generally in the direction of the arrow A in FIG. 4.

Head 30 has a top exit 31 that communicates with the lower portion of a pulverizer drum 35 positioned above head 30. Top exit 31 of head 30 is defined between the upper edge of a front wall 36 of head 30 and an arcuate shield or rear wall 38 of head 30. As brush 20 rotates in the direction of the arrow A in FIG. 4, the aeration cores that have been picked up by brush 20 will release from brush 20 and pass through top exit 31 of head 30 after bristles 34 clear front wall 36 of head 30.

A rotary pulverizer 22 is housed within semi-cylindrical pulverizer drum 35. Pulverizer 22 comprises a pulverizer shaft 40 having a plurality of spiders 42 carried thereon along the length of shaft 40. Each spider 42 mounts a plurality of fixed pulverizing blades 44 that extend radially outwardly relative to shaft 40 with blades 44 being circumferentially spaced around the circumference of pulverizer 22. Rather than using fixed blades 44, pulverizer 22 could carry pivotal blades or flexible flails if so desired. Spiders 42 and blades 44 are closely spaced across the length of shaft 40, with the number or spiders 42 and blades 44 having been decreased and the lateral distance between spiders 42 having been greatly exaggerated in FIGS. 5 and 6 for the purpose of clarity. The tips of blades 44 could wind helically around the axis of shaft 40 or could be aligned in straight transverse rows.

Pulverizer 22 rotates within a generally semi-cylindrical drum 35 that is closed off by a peripheral wall 46 at the top and front as shown in FIG. 1. The general arcuate extent of peripheral wall 46 is indicated by the arc a in FIG. 4. Peripheral wall 46 of drum 35 has not been shown in FIGS. 5 and 6. The top and rear of drum 35 lacks any type of enclosing peripheral wall such that drum 35 has a rear discharge opening 48. The particle core debris created by the pulverizing action of pulverizer 22 on the aeration cores will be discharged to the rear of processor 2 through rear discharge opening 48. Pulverizer 22 is rotated in the same direction of rotation as brush 20, namely in a clockwise direction as indicated by the arrow B in FIG. 4.

Referring again to FIG. 4, the axis of rotation of brush 20 lies slightly to the rear of the axis of rotation of pulverizer 22. This location in conjunction with the diameters of brush 20 and pulverizer 22 ensures that the aeration cores will be discharged into the bottom of pulverizer 22, which is moving forwardly in an opposite direction to the rearward path of movement of the aeration cores as they are released by brush 20. This difference in direction at the moment of impact with pulverizer 22, namely rearwardly moving cores being thrown against forwardly moving blades 44, enhances the ability of blades 44 to comminute or disintegrate the aeration cores into very small particles, which will be referred to as particle core debris. This debris is then swept around the enclosing front and top peripheral wall 46 of drum 35 until it reaches the top of drum 35. There the particle core debris is thrown out through rear discharge opening 48 in a rearwardly directed stream indicated by the arrows C in FIG. 4.

To protect bystanders or onlookers from being struck by any of the particle core debris, a generally U-shaped shroud or hood 50 is attached to the top and rear of housing 6. Hood 50 extends rearwardly for some distance. The particle core debris will fall out of hood 50 as it passes rearwardly in the stream C in FIG. 4. Any stray particles that might otherwise pose a problem will be intercepted by the walls of hood 50 and knocked or deflected down onto the ground.

A small diameter powered roller 24 is preferably located at the junction between the orbits of brush 20 and pulverizer 22, i.e. at the front edge of top exit 31 in head 30 and at the lower or leading edge of the enclosing peripheral wall 46 of drum 35 taken with reference to the direction B of rotation of pulverizer 22. Roller 24 is also rotating in the same direction as brush 20 and pulverizer 22, namely in a clockwise direction as indicated by the arrow D in FIG. 4. However, due to its location and size, any portions of the cores that might be thrown by pulverizer 22 towards or onto the junction will hit the top rearwardly moving surface of roller 24. Thus, roller 24 will tend to deflect these portions of the cores back down into brush 20 to allow them to be rethrown again by brush 20 into pulverizer 22.

Basically, the purpose of roller 24 is to help keep the junction between head 30 and drum 35 clean and free of build up from the cores or partially comminuted portions of the cores. The addition of rotating roller 24 at this junction does that. It simply provides a moving surface to which cores are much less likely to stick. In addition, because the top of roller 24 is moving rearwardly while pulverizer 22 is moving forwardly, it helps knock back any core portions that impact on roller 24 back into brush 20 for another pass through head 30 and for being rethrown by brush 20.

Brush 20, pulverizer 22, and roller 24 are all driven in any suitable manner from engine 8. Engine 8 powers a drive shaft 52 that is operatively connected to one end of pulverizer shaft 40 by a belt drive 54. See FIG. 2. The opposite end of pulverizer shaft 40 is connected by a belt drive 56 to one end of brush shaft 32. See FIG. 3. Finally, the opposite end of brush shaft 32 is connected by a belt drive 58 to one end of an outwardly protruding shaft 60 of roller 24. See FIG. 2 again. Due to the sizes of the pulleys used in belt drives 54, 56 and 58, the rotational speeds of brush 20 and roller 24 will be approximately the same and will be lower than the rotational speed of pulverizer 22.

Processor 2 of this invention effectively and quickly picks up and comminutes aeration cores into very small particle core debris. The arrangement of brush 20 relative to pulverizer 22 with brush 20 throwing rearwardly moving cores into the forwardly moving blades 44 of pulverizer 22 shatters the cores quite easily. There is no need to have other inwardly protruding flanges or surfaces sticking inwardly from the wall of drum 35 to assist in this core comminution. Thus, potentially troublesome surfaces that present obstacles to the core flow and provide areas on which the particle core debris can build up are now absent in this design. The particle core debris simply exits housing 6 of processor 2 through the open rear discharge opening 48. Hood 50 prevents any undesired movement of the particle core debris in directions that might strike bystanders. Thus, processor 2 of this invention provides better core pulverization with less chance of plugging or fouling than many of the existing core processors known today.

In addition, use of transport wheels 10 in the transport mode effectively raises housing 6 of processor 2 off the ground. This allows processor 2 to be towed at a substantially higher transport speed by a vehicle to which processor 2 is attached. Frame 4 of processor 2 includes a forwardly extending tongue 70 with a hitch 72 for allowing processor 2 to be attached to a towing vehicle (not shown). However, in the work mode, transport wheels 10 are lifted off the ground and housing 6 of processor 2 is engaged with the ground. In this work mode, housing is supported for rolling only by rear roller 26 carried on head 30 behind brush 20. Processor 2 can now be driven or towed more slowly over the ground with rear roller 26 enhancing the ground following ability of processor 2.

Figure 8:
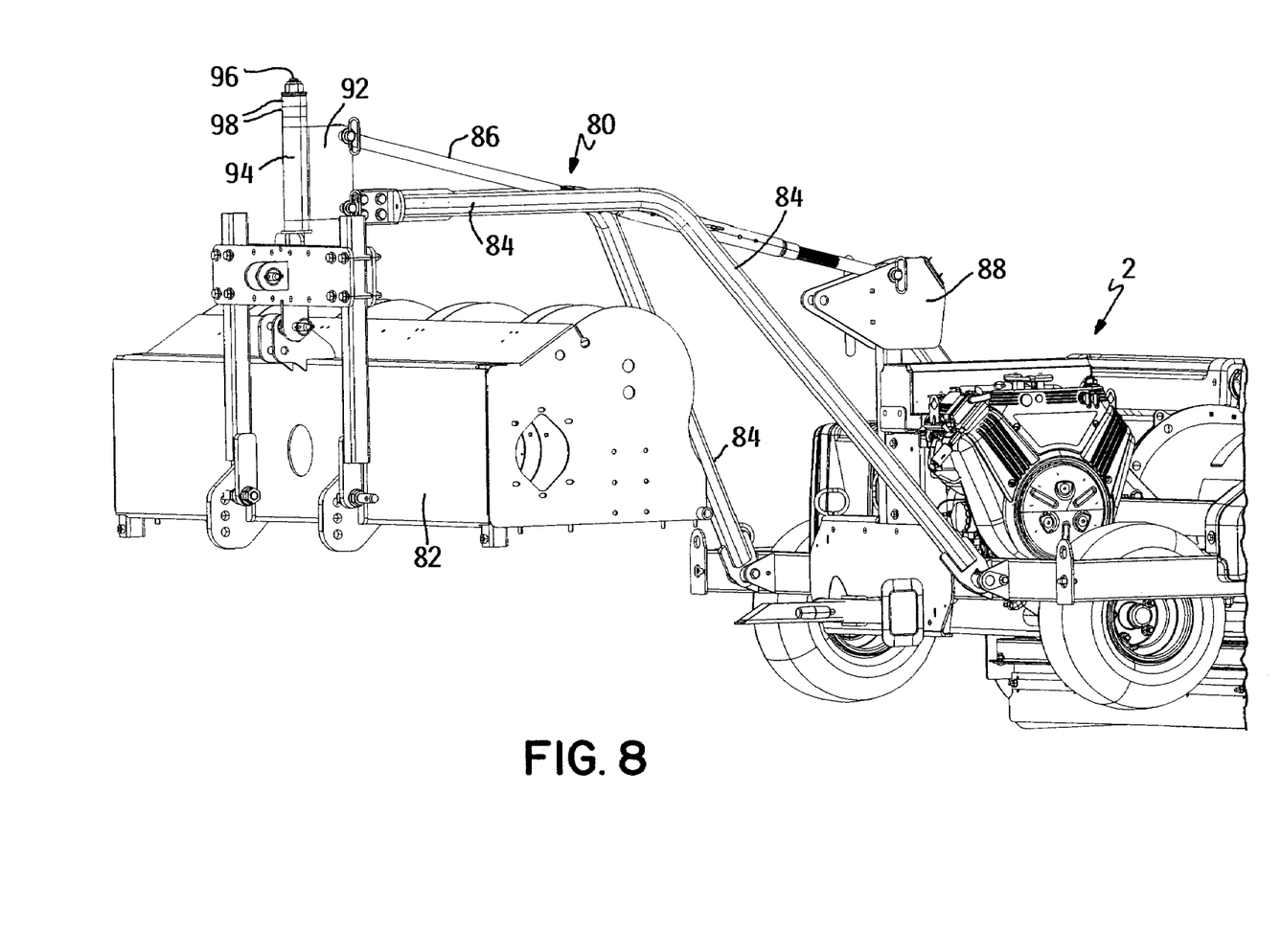
FIG. 8 is a perspective view of the front core processor of FIG. 1, particularly illustrating the core processor hitched to a turf aerator for one pass operation.
Figure 9:
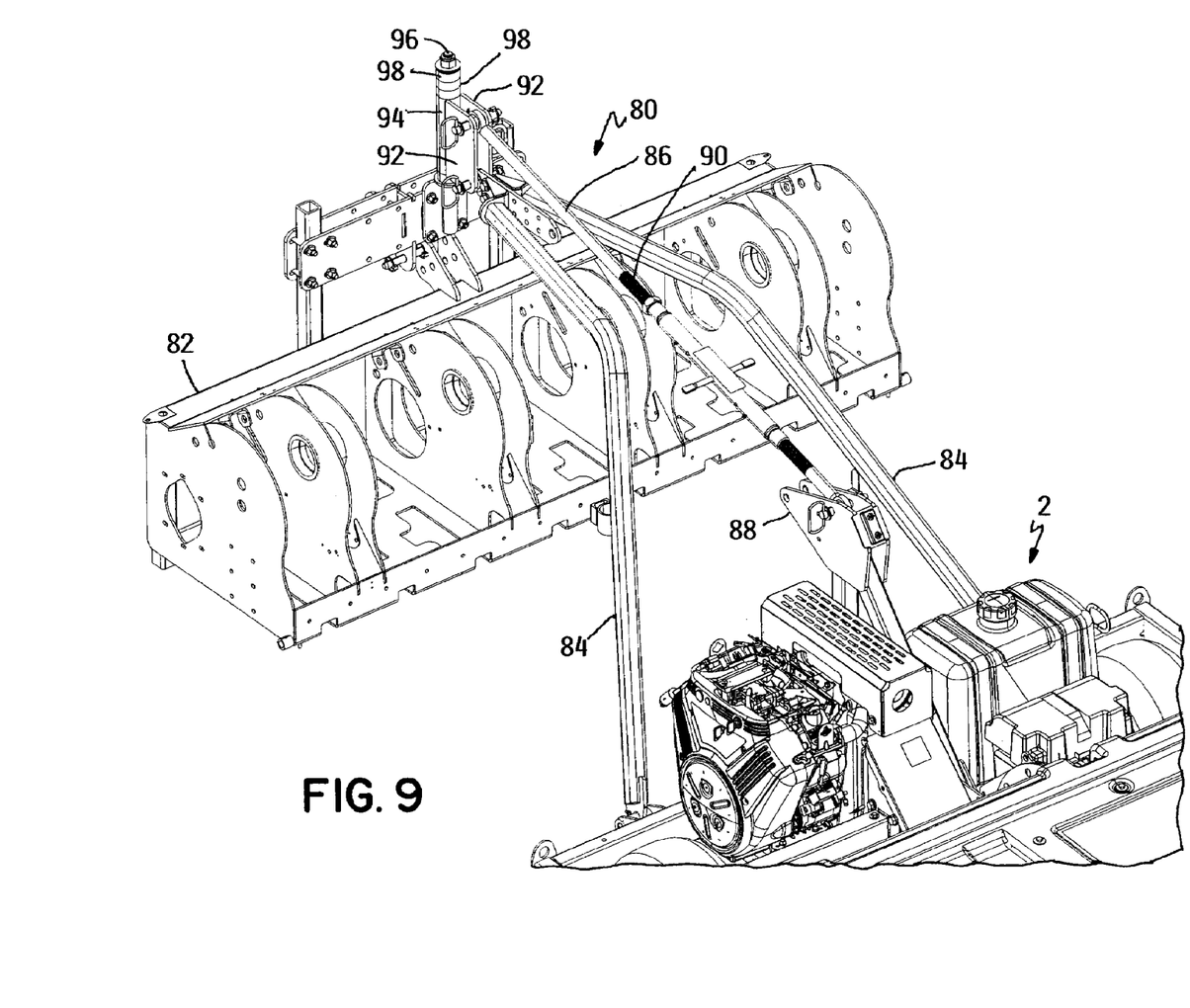
FIG. 9 is a perspective view similar to FIG. 8, but looking at the hitch connection between the turf aerator and the core processor from the rear of the hitch.

FIGS. 8 and 9 show an alternative hitch 80 for processor 2 allowing processor 2 to be connected to an existing turf aerator, shown only generally as 82 in FIGS. 8 and 9. Turf aerator 82 is the machine that is aerating the turf surface, pulling the aeration cores out of the ground, and then depositing the aeration cores onto the ground. The trailing or following core processor 2 then picks up and comminutes the aeration cores substantially immediately after they have been left on the ground by turf aerator 82. This enables one pass aeration and core processing, namely the step of aerating the turf surface and the step of pulverizing the aeration cores takes place in a single pass over the turf surface.

Hitch 80 used for one pass processing includes a three point hitch linkage comprising a pair of lower link arms 84 and a top link 86. Lower link arms 84 are pivotally connected to the front of frame 4 of processor 2 and top link 86 is pivotally connected to an elevated central bracket 88 provided on the top of the front of frame 4. Top link 86 is adjustable in length by virtue of a threaded adjuster 90 of known design intermediate the ends of top link 86. Top link 86 is relatively straight, but lower link arms 84 are L-shaped having a generally horizontal front section and an inclined rear section that extends downwardly relative to the front section. Thus, the front section of each lower link arm 84 is raised relative to the rear section of each lower link arm 84.

The front ends of lower link arms 84 and top link 86 are pivotally connected between a pair of forked arms 92 on a pivotal hub 94 as shown in FIG. 9. Hub 94 is received on an upwardly extending pivot shaft or stem 96 carried on frame 4 of turf aerator 82. Hub 94 allows processor 2 to steer or pivot about the vertical axis of stem 96 during turns of the aerator or the towing vehicle. The height of hub 94 on stem 96 can be adjusted in a known manner using cylindrical spacers 98 received around stem 96. Different numbers of spacers 98 can be added to stem 96 above and below hub 94 to adjust the vertical height of hub 94 on stem 96.

Various modifications of this invention will be apparent to those skilled in the art. Thus, the scope of this invention will be limited only by the appended claims.

We claim:

1. A core processor for turf aeration cores, which comprises:
   (a) a frame supported for movement over the ground;
   (b) a powered rotary brush carried on the frame for picking up aeration cores from the ground;
   (c) a powered rotary pulverizer carried on the frame with the pulverizer rotating at a faster rotational speed than the brush for receiving aeration cores from the brush, for pulverizing such cores into particles, and for throwing substantially all the core particles from a top portion of the rotary pulverizer in a rearward direction relative to the frame, and wherein the rotary pulverizer rotates about a horizontal axis of rotation that is forward of a horizontal axis of rotation about which the brush rotates when the frame is on level ground and when taken with respect to a forward direction of motion of the frame; and (d) a rear discharge opening located on the frame for receiving substantially all the core particles from the pulverizer and for discharging the core particles in a rearward direction from the frame.

2. The core processor of claim 1, wherein the frame is supported for movement over the ground during a work mode solely by a substantially full width rear roller carried behind the brush.

3. The core processor of claim 2, wherein the frame is supported for movement over the ground during a transport mode by a pair of rotatable transport wheels instead of the rear roller.

4. The core processor of claim 3, wherein the transport wheels are movable on the frame between a raised position in the work mode where the transport wheels are out of engagement with the ground and the rear roller is in engagement with the ground and a lowered position in the transport mode where the transport wheels are in engagement with the ground and the rear roller is out of engagement with the ground.

5. The core processor of claim 1, further including a hood or shroud extending rearwardly from the frame over the rear discharge opening.

6. A core processor for turf aeration cores, which comprises:

(a) a frame that is movable over the ground;

(b) a housing carried on the frame, wherein the housing carries:

(i) a powered rotary pulverizer that rotates about a substantially horizontal axis inside a drum with the drum having an arcuate peripheral wall that forms a substantially semi-cylindrical portion of a cylinder, wherein the arcuate peripheral wall of the drum has a leading edge taken with respect to the direction of rotation of the pulverizer and a trailing edge that defines where a discharge opening from the drum begins;

(ii) a powered rotary pick up brush that rotates about a substantially horizontal axis in a pick up head below the drum with the pick up head having an exit therefrom into the drum so that aeration cores can pass from the pick up head into the drum, wherein one edge of the exit of the pick up head is immediately proximate to the leading edge of the peripheral wall of the drum to form a junction between the head and the drum with the pulverizer rotating in a direction towards the junction during operation of the pulverizer; and (iii) a powered roller located immediately proximate to and sized to substantially span across and cover the junction between the head and the drum, and wherein the powered roller has a top surface that is moving oppositely to the direction of movement of the rotary pulverizer adjacent the junction to help prevent core material being circulated by the pulverizer from sticking to the junction by throwing such material reversely and downwardly away from the junction to keep the junction free of a build up of core material; and (c) wherein in a work mode of the core processor the brush picks up aeration cores from the ground, delivers the aeration cores to the rotary pulverizer which comminutes or pulverizes the aeration cores, and the particle debris so created exits through the discharge opening.

* * * * *